United States Patent
Nakazato

(10) Patent No.: US 6,782,468 B1
(45) Date of Patent: Aug. 24, 2004

(54) SHARED MEMORY TYPE VECTOR PROCESSING SYSTEM, INCLUDING A BUS FOR TRANSFERRING A VECTOR PROCESSING INSTRUCTION, AND CONTROL METHOD THEREOF

(75) Inventor: Satoshi Nakazato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/459,565

(22) Filed: Dec. 13, 1999

(30) Foreign Application Priority Data

Dec. 15, 1998 (JP) .......................................... 10-375410

(51) Int. Cl.$^7$ .............................................. G06F 15/76
(52) U.S. Cl. .............................. 712/9; 712/31; 712/214; 709/213
(58) Field of Search ................................ 712/214, 215, 712/2, 7, 9, 31; 709/246, 247, 248, 213

(56) References Cited

U.S. PATENT DOCUMENTS

| | | | |
|---|---|---|---|
| 5,737,328 A | * | 4/1998 | Norman et al. ............. 370/331 |
| 5,822,606 A | * | 10/1998 | Morton ........................ 712/23 |
| 5,835,697 A | * | 11/1998 | Watabe et al. ................ 714/11 |

FOREIGN PATENT DOCUMENTS

| | | |
|---|---|---|
| JP | 59-106075 A | 6/1984 |
| JP | 63-10263 | 1/1988 |
| JP | 63-127368 | 5/1988 |
| JP | 02-33663 A | 2/1990 |
| JP | 3-14063 A | 1/1991 |
| JP | 3-46078 A | 2/1991 |
| JP | 04-84256 A | 3/1992 |

OTHER PUBLICATIONS

Mills, Philip M., A Control Architecture for Centralized Multi–Master–Slave Processor System, 1976, Proceedings of the 14th Annual ACM Southeast Regional Conference, ACM Press, pp. 165–171.*

* cited by examiner

*Primary Examiner*—Eddie Chan
*Assistant Examiner*—Tonia L. Meonske
(74) *Attorney, Agent, or Firm*—Sughrue Mion, PLLC

(57) ABSTRACT

A shared memory type vector processing system in which CPUs are connected by a bus for transferring a vector processing instruction generated from any of the CPUs to each of the CPUs, and the respective CPUs are grouped into a master CPU which issues a vector processing instruction to other CPUs and slave CPUs operating as a multi-vector pipeline in synchronization with a vector processing unit in the master CPU, the master CPU including a memory access control unit for issuing said vector processing instruction with issuing source CPU information attached for identifying an issuing source CPU, and transferring said instruction to all the CPUs including its own CPU through a bus, and the master CPU and the slave CPU including a vector processing instruction control unit for comparing issuing source CPU information contained in a vector processing instruction and master CPU information set at its own CPU and conducting instruction issuance based on the vector processing instruction when the information accord with each other and invalidating the vector processing instruction when the information fail to accord with each other.

22 Claims, 10 Drawing Sheets

SHARED MEMORY TYPE VECTOR PROCESSING SYSTEM, INCLUDING A BUS FOR TRANSFERRING A VECTOR PROCESSING INSTRUCTION, AND CONTROL METHOD THEREOF

BACKGROUND OF THE INVENTION

1. Field of the Invention

The present invention relates to a shared memory type vector processing system including a plurality of CPUs sharing a main storage memory and each having a scalar processing unit and a plurality of vector processing units forming a vector pipeline.

2. Description of the Related Art

FIG. 9 shows structure of a shared memory type parallel processing system employing a CPU in a conventional vector processing device. In this system, a plurality of CPUs 100a–100n are connected to share one main storage device 200.

Detailed structure of each of the CPUs 100a–100n is shown in FIG. 10. Each of the CPUs 100a–100n includes, as illustrated in the figure, a scalar processing unit 101, an instruction control unit 102, vector processing units 104a–104n and a memory access network unit 105.

An external processing instruction "EX-RQ" issued from the scalar processing unit 101 is transferred to the instruction control unit 102. The instruction control unit 102 issues a vector processing instruction "V-RQ" through the management of resources of the vector processing units 104a–104n existing only in its own CPU.

Therefore, structure of the scalar processing unit 101 and a vector pipeline in each of the CPUs 100a–100n is always constant and can not be changed.

Examples of conventional vector processing devices are disclosed, for example, in Japanese Patent Laying-Open (Kokai) No. Showa 63-127368 and Japanese Patent Laying-Open (Kokai) No. Showa 63-10263. In either of the vector processing devices disclosed in the literature, structure of a scalar processing unit and a vector pipeline is fixed and fails to allow the number of vector pipelines accompanying the scalar processing unit to be flexibly modified according to purposes.

The above-described conventional vector processing device have the following problems.

The first problem is that while a vectorization rate and the like varies according to an application to run, an appropriate vector processing resource can not be assigned thereto.

The reason is that since the number of vector pipelines at each CPU is constant at any time, when an application with a vectorization rate lower than expected runs, surplus of vector resources is caused. By contraries, when an application with a higher vectorization rate or longer vector length runs, vector pipelines whose structure is fixed in advance limits the upper bound of vector processing performance to prevent further improvement of processing performance.

The second problem is that even when an integration degree of Large Scale Integrated Circuits, LSIs, is increased, still remains the necessity of developing a scalar processing unit and vector pipe line as separate LSIs.

The reason is that although higher integration of LSIs enables a scalar processing unit and approximately one vector pipeline to be made into one chip, because conventional multi-vector pipeline structure does not allow the use of a scalar processing unit existing in each LSI at the time of connecting a plurality of such LSIs, the volume of hardware will be wastefully used, resulting in developing a scalar processing unit and a vector pipeline as separate LSIs as is conventionally done. This method, however, involves many factors contributing to cost increase, such as an increase in the number of LSI development processes, an increase in the number of kinds of LSI developments and a reduction in the number of products of each kind of LSI.

SUMMARY OF THE INVENTION

An object of the present invention is to provide a vector processing system which allows the number of vector pipelines accompanying a scalar processing unit to be changed flexibly according to purposes.

Another object of the present invention is to provide a vector processing system which operates as if it shared a single vector pipeline from a scalar processing unit of each independent processor.

According to the first aspect of the invention, a shared memory type vector processing system including a plurality of CPUs sharing a main storage memory and each having scalar processing means and vector processing means, wherein the CPUs are divisionally set to be a master CPU and a plurality of slave CPUs, and the vector processing means of the plurality of slave CPUs are operated as a multi-vector pipeline accompanying the scalar processing of the master CPU.

According to the second aspect of the invention, a shared memory type vector processing system including a plurality of CPUs sharing a main storage memory and each having scalar processing means and vector processing means, wherein the vector processing means of the plurality of CPUs are all regarded as a single multi-vector pipeline to operate as if each scalar processing means of each the CPU shared the single multi-vector pipeline.

According to the third aspect of the invention, a shared memory type vector processing system including a plurality of CPUs sharing a main storage memory and each having scalar processing means and vector processing means, wherein the CPUs are connected to each other by a path for transferring a vector processing instruction generated from each the CPU to each CPU, and each the CPU comprises:

issuing means for issuing a vector processing instruction with issuing source CPU information attached for identifying an issuing source CPU, and transferring the instruction to all the CPUs including its own CPU through the path, and vector processing instruction control means for comparing the issuing source CPU information contained in the vector processing instruction transferred and structure information regarding a vector pipeline of its own CPU to determine contents of processing for the vector processing instruction transferred.

According to the fourth aspect of the invention, a shared memory type vector processing system including a plurality of CPUs sharing a main storage memory and each having scalar processing means and vector processing means, wherein the CPUs are connected to each other by a path for transferring a vector processing instruction generated from each the CPU to each CPU, the CPUs are divisionally set to be a master CPU for executing scalar processing, as well as issuing a vector processing instruction to other CPU and a slave CPU for receiving a vector processing instruction transferred from the master CPU to operate as a multi-vector pipeline in synchronization with the vector processing unit in the master CPU, the master CPU comprises issuing means for issuing the vector processing instruction with issuing source CPU information attached for identifying an issuing source CPU, and transferring the instruction to all the CPUs including its own CPU through the path, and the master CPU and the slave CPU comprises vector processing instruction control means for comparing the issuing source CPU information contained in the vector processing instruction transferred and master CPU information set at its own CPU to issue, to the vector processing means, an instruction based on the vector processing instruction transferred when the information accord with each other and invalidate the vector processing instruction when the information disaccord with each other.

In the preferred construction, the vector processing instruction control means of the master CPU and the slave CPU comprise extraction means for separating the vector processing instruction transferred into a main body of the vector processing instruction and the issuing source CPU information and outputting the instruction and information, comparison means for comparing the issuing source CPU information separated and the master CPU information set at its own CPU, invalidation processing means for storing the vector processing instruction from the extraction means into an instruction stack when a comparison by the comparison means results in finding accord, and invalidating the vector processing instruction when the comparison results in finding disaccord, and instruction issuing processing means for issuing an instruction based on the vector processing instruction stored in the instruction stack to the vector processing means according to re source conditions of the vector processing unit.

In another preferred construction, the vector processing instruction control means of the master CPU and the slave CPU comprise an instruct ion stack for storing the vector processing instruction transferred, and instruction issuing processing means for comparing the issuing source CPU information contained in the vector processing instruction stored in the instruction stack and master CPU information set at its own CPU and when a comparison results in finding accord, issuing an instruction based on the vector processing instruction to the vector processing means and when the comparison results in finding disaccord, refraining from issuing an instruction based on the vector processing instruction to release the relevant area of the instruction stack, and in the instruction stack, the vector processing instruction is stored with the issuing source CPU information contained.

In another preferred construction, the vector processing instruction control means of the master CPU and the slave CPU comprise stopping means for stopping operation of the scalar processing means of its own CPU when its own CPU is a slave CPU, the stopping means including:

storage means for storing master CPU information indicative of a CPU functioning as a master CPU for its own CPU and CPU information of its own CPU, and comparison means for comparing master CPU information and its own CPU information stored in the storage means when the vector processing instruction is transferred and outputting an operation stop signal of the scalar processing means of its own CPU when the comparison results in finding disaccord.

According to the fifth aspect of the invention, a shared memory type vector processing system including a plurality of CPUs sharing a main storage memory and each having scalar processing means and vector processing means, wherein the CPUs are connected to each other by a path for transferring a vector processing instruction generated from each the CPU to each CPU, and each the CPU comprises:

issuing means for issuing a vector processing instruction with issuing source CPU information attached for identifying an issuing source CPU, and transferring the instruction to all the CPUs including its own CPU through the path, and vector processing instruction control means for storing the vector processing instruction transferred in a plurality of instruction stacks corresponding to the respective CPUs based on the issuing source CPU information to control instruction issuance based on the vector processing instruction according to priority of each of the plurality of instruction stacks and resource information of the vector processing means.

In the preferred construction, the vector processing instruction control means of each the CPU comprises a plurality of instruction stacks corresponding to the respective CPUs, instruction issuing source detection means for detecting the issuing source CPU information contained in the vector processing instruction transferred and storing the vector processing instruction in the instruction stack corresponding to the information, arbitration means for determining, for each of the plurality of instruction stacks, instruction issuance based on a vector processing instruction from which instruction stack the priority is to be given to, and instruction issuing processing means for issuing an instruction based on the vector processing instruction to the vector processing means according to the contents determined by the arbitration means and resource information of the vector processing means.

According to the sixth aspect of the invention, a shared memory type vector processing system including a plurality of CPUs sharing a main storage memory and each having scalar processing means and vector processing means, comprising the steps of:

at each the CPU issuing a vector processing instruction with issuing source CPU information attached for identifying an issuing source CPU, and transferring the instruction to all the CPUs including its own CPU through a path connecting the CPUs to each other, and comparing the issuing source CPU information contained in the vector processing instruction transferred and structure information regarding a vector pipeline of its own CPU to determine contents of processing for the vector processing instruction transferred.

According to the seventh aspect of the invention, a method of controlling a shared memory type vector processing system including a plurality of CPUs sharing a main storage memory and each having scalar processing means and vector processing means, comprising the steps of:

divisionally setting the CPUs to be a master CPU for executing scalar processing, as well as issuing a vector processing instruction to other CPU and a slave CPU for receiving a vector processing instruction transferred from the master CPU to operate as a multi-vector pipeline in synchronization with a vector processing unit in the master CPU, at the master CPU, issuing the vector processing instruction with issuing source CPU information attached for identifying an issuing source CPU, and transferring the instruction to all the CPUs including its own CPU through a path connecting the CPUs to each other, and at the master CPU and the slave CPU comparing the issuing source CPU information contained in the vector processing instruction transferred and master CPU information set at its own CPU, and issuing, to the vector processing means, an instruction based on the vector processing instruction transferred when a comparison results in finding accord and invalidating the vector processing instruction when the comparison results in finding disaccord.

In the preferred construction, the method of controlling a shared memory type vector processing system further comprising the steps of at the master CPU and the slave CPU comparing the issuing source CPU information contained in the vector processing instruction transferred and master CPU information set at its own CPU, storing the vector processing instruction in an instruction stack when a comparison results in finding accord and invalidating the vector processing instruction when the comparison results in finding disaccord, and issuing an instruction based on the vector processing instruction stored in the instruction stack to the vector processing means according to resource conditions of the vector processing means, and at the master CPU and the slave CPU comparing the issuing source CPU information contained in the vector processing instruction stored in the instruction stack and master CPU information set at its own CPU, and issuing an instruction based on the vector processing instruction to the vector processing means when a comparison results in finding accord and refraining from issuing an instruction based on the vector processing instruction to release a relevant area of the instruction stack when a comparison results in finding disaccord.

In another preferred construction, the method of controlling a shared memory type vector processing system further comprising the step of stopping operation of the scalar processing means of its own CPU when its own CPU is a slave CPU.

According to the eighth aspect of the invention, a method of controlling a shared memory type vector processing system including a plurality of CPUs sharing a main storage memory and each having scalar processing means and vector processing means, comprising the steps of:

connecting the CPUs to each other by a path for transferring a vector processing instruction generated from each the CPU to each CPU, and at each the CPU issuing a vector processing instruction with issuing source CPU information attached for identifying an issuing source CPU, and transferring the instruction to all the CPUs including its own CPU through the path, and storing the vector processing instruction transferred in a plurality of instruction stacks corresponding to the respective CPUs based on the issuing source CPU information to control instruction issuance based on the vector processing instruction according to priority of each of the plurality of instruction stacks and resource information of the vector processing means.

In the preferred construction, the method of controlling a shared memory type vector processing system further comprising the steps of:

at each the CPU detecting the issuing source CPU information contained in the vector processing instruction transferred and storing the vector processing instruction in the instruction stack corresponding to the information, determining, for each of the plurality of instruction stacks, instruction issuance based on a vector processing instruction from which instruction stack the priority is to be given to, and issuing an instruction based on the vector processing instruction to the vector processing means according to the determination contents and resource information of the vector processing means.

According to the ninth aspect of the invention, a computer readable memory which stores a control program for controlling a shared memory type vector processing system including a plurality of CPUs sharing a main storage memory and each having scalar processing means and vector processing means, the control program comprising the steps of:

issuing a vector processing instruction with issuing source CPU information attached for identifying an issuing source CPU, and transferring the instruction to all the CPUs including its own CPU through a path connecting the CPUs to each other, and comparing the issuing source CPU information contained in the vector processing instruction transferred and structure information regarding a vector pipeline of its own CPU to determine contents for processing for the vector processing instruction transferred.

According to the tenth aspect of the invention, a computer readable memory which stores a control program for controlling a shared memory type vector processing system including a plurality of CPUs sharing a main storage memory and each having scalar processing means and vector processing means, the control program comprising the steps of:

divisionally setting the CPUs to be a master CPU for executing scalar processing, as well as issuing a vector processing instruction to other CPU and a slave CPU for receiving a vector processing instruction transferred from the master CPU to operate as a multi-vector pipeline in synchronization with a vector processing unit in the master CPU, at the master CPU,
issuing the vector processing instruction with issuing source CPU information attached for identifying an issuing source CPU, and transferring the instruction to all the CPUs including its own CPU through the path, and
at the master CPU and the slave CPU
comparing the issuing source CPU information contained in the vector processing instruction transferred and master CPU information set at its own CPU, and
issuing, to the vector processing means, an instruction based on the vector processing instruction transferred when a comparison results in finding accord and invalidating the vector processing instruction when the comparison results in finding disaccord.

According to another aspect of the invention, a computer readable memory which stores a control program for controlling a shared memory type vector processing system including a plurality of CPUs sharing a main storage memory and each having scalar processing means and vector processing means, the control program comprising the steps of:

issuing a vector processing instruction with issuing source CPU information attached for identifying an issuing source CPU, and transferring the instruction to all the CPUs including its own CPU through a path connecting the CPUs to each other, and storing the vector processing instruction transferred in a plurality of instruction stacks corresponding to the respective CPUs based on the issuing source CPU information to control instruction issuance based on the vector processing instruction according to priority of each of the plurality of instruction stacks and resource information of the vector processing means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
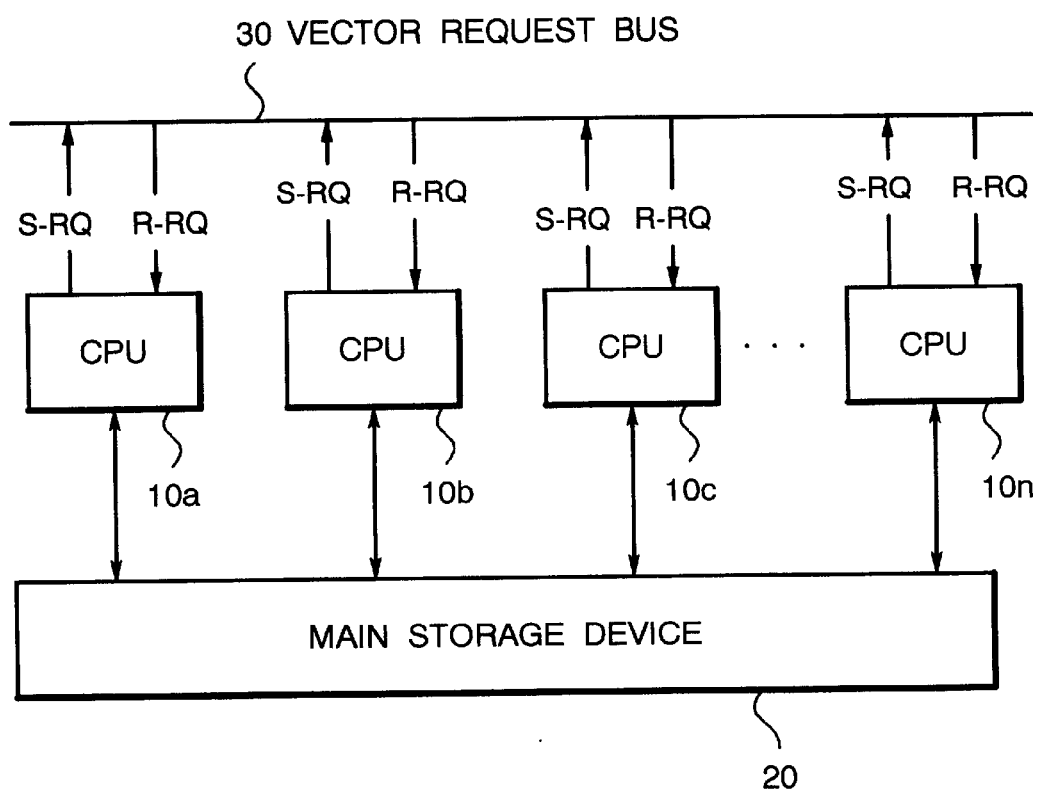
FIG. 1 is a diagram showing entire structure of a vector processing system according to a first embodiment of the present invention.

FIG. 1 is a diagram showing entire structure of a vector processing system according to a first embodiment of the present invention.

The vector processing system according to the present embodiment includes a plurality of CPUs 10a–10n which share a single main storage device 20 to constitute a shared memory type parallel processing system. The respective CPUs 10a–10n are connected to each other through a vector request bus 30 to transmit and receive a request and a reply regarding vector processing to and from each other.

Detailed structure of the above CPUs 10a–10n will be described with reference to FIG. 2.

Each of the CPUs 10a–10n includes one scalar processing unit 11, a memory access instruction control unit 12, a vector processing instruction control unit 13, a plurality of vector processing units 14a–14n and a memory access network unit 15.

An external processing instruction "EX-RQ" externally issued from the scalar processing unit 11 is transferred through the memory access control unit 12 to the main storage device 20 via the memory access network unit 15 or sent to the vector processing instruction control units 13 of all the CPUs 10a–10n via the vector request bus 30 and then issued to the vector processing units 14a–14n.

Figure 3:
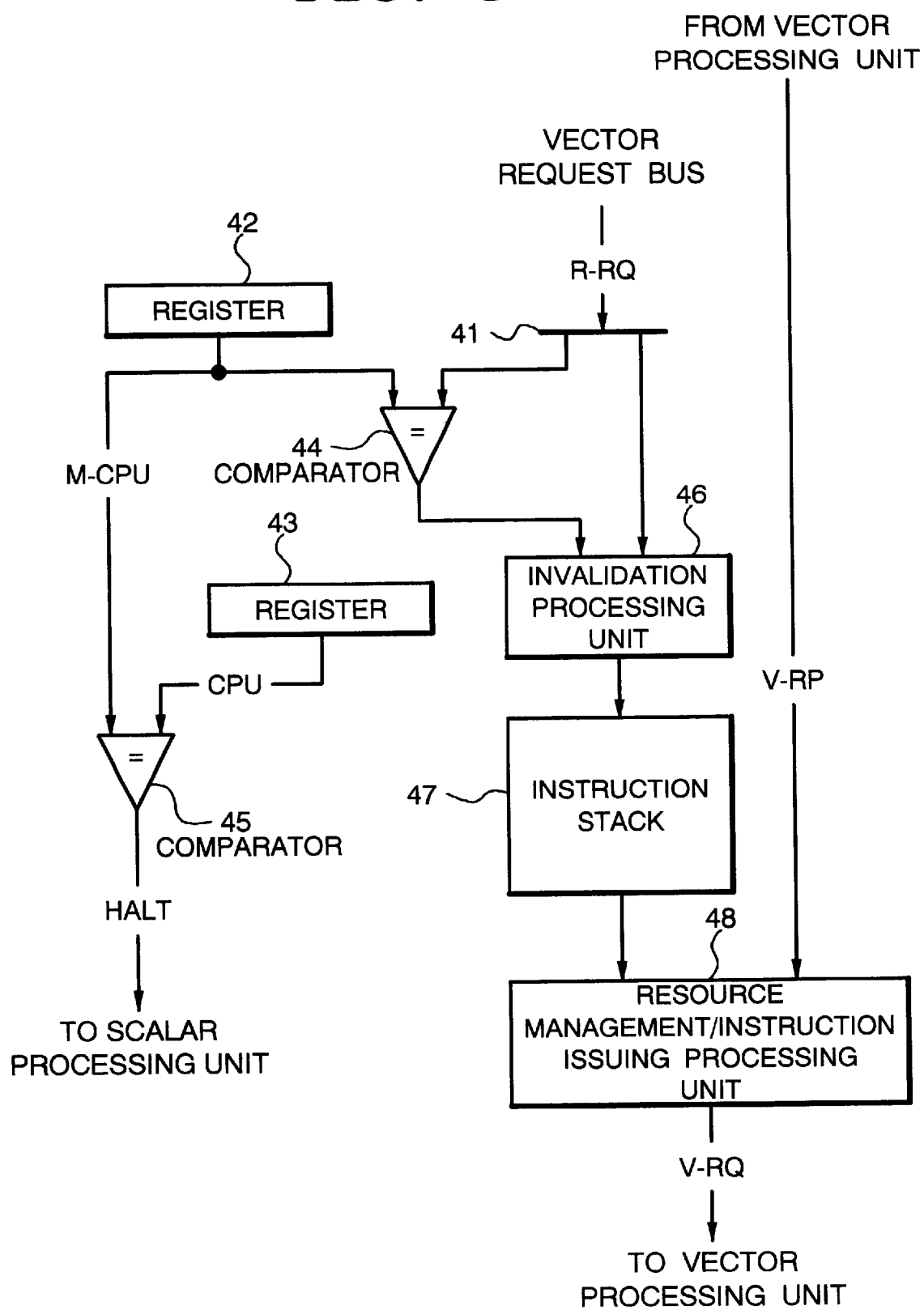
FIG. 3 is a block diagram showing details of a vector processing instruction control unit of the above vector processing system according to the first embodiment.

Here, FIG. 3 is a block diagram showing detailed structure of the vector processing instruction control unit 13.

The vector processing instruction control unit 13 has two registers 42, 43, a comparator 45 for comparing the contents of these registers 42 and 43, a comparator 44 for comparing issuing source information of a vector processing instruction obtained by an instruction issuing source information extraction unit 41 which separates the contents of a vector processing instruction transferred via the vector request bus 30 and the contents of one register 42, an instruction invalidation processing unit 46, an instruction stack 47, and a resource management/instruction issuing processing unit 48.

A vector processing instruction obtained from the instruction issuing source information extraction unit 41 and an output of the comparator 44 are applied to the invalidation processing unit 46 and then stored in the instruction stack 47. The vector processing instruction stored in the instruction stack 47 is applied to the resource management/ instruction issuing processing unit 48 together with resource information etc. from the vector processing units 14a–14n to issue an instruction to the vector processing units 14a–14n.

Next, operation of thus structured vector processing system according to the first embodiment will be described.

Figure 2:
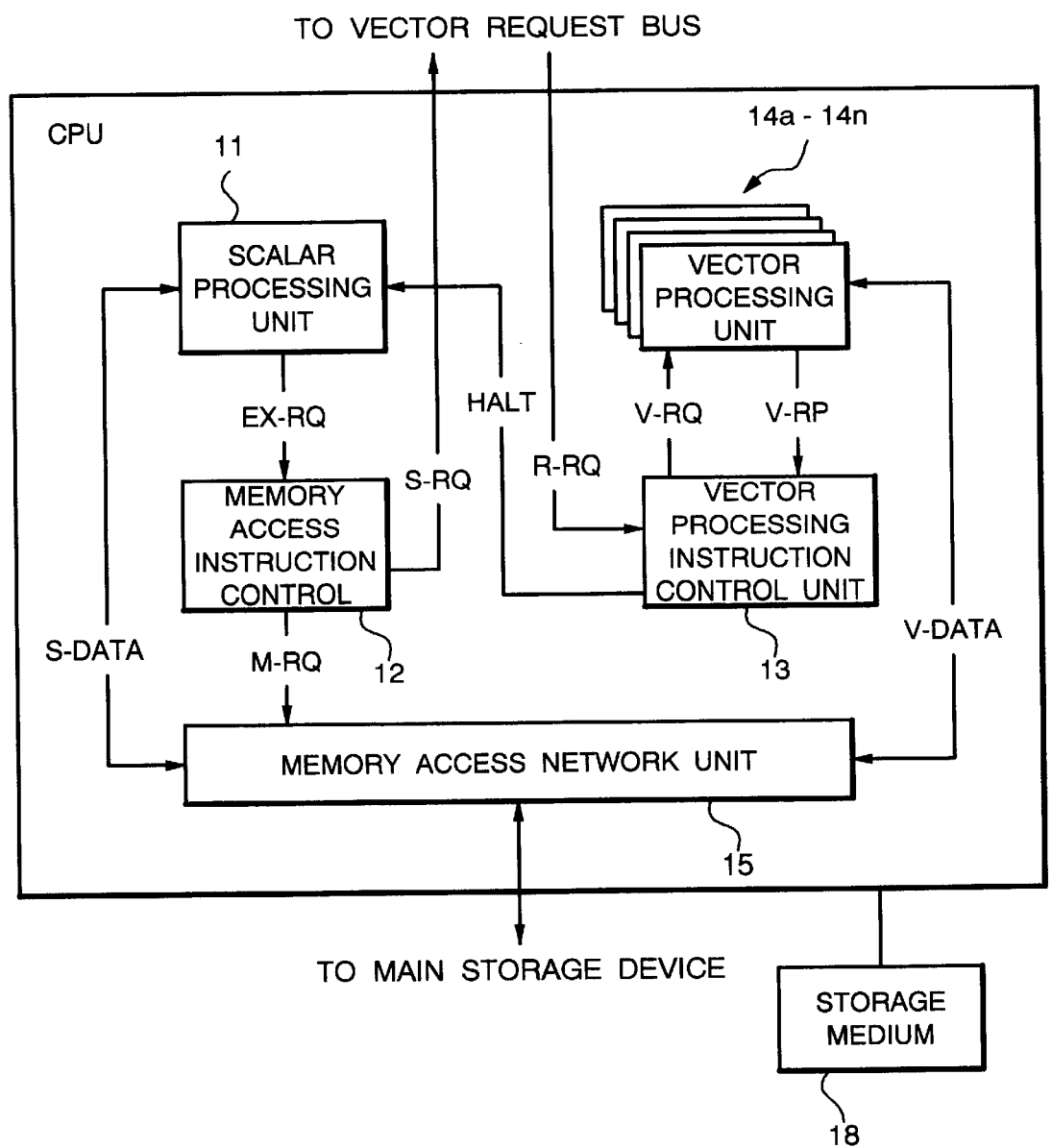
FIG. 2 is a block diagram showing detailed structure of each CPU of the above-described vector processing system according to the first embodiment.

In FIG. 2, the scalar processing unit 11 decodes instructions to conduct scalar processing instruction executing processing. Here, when there arises such an instruction not executable at the scalar processing unit 11 as an instruction to access the main storage device 20 and a vector processing instruction, the scalar processing unit 11 transfers these instructions to the memory access instruction control unit 12 as an external processing instruction "EX-RQ".

The memory access instruction control unit 12 decodes the external processing instruction "EX-RQ" received from the scalar processing unit 11 and if it is an instruction "M-RQ" of the main storage access line, issues the instruction to the memory access network unit 15 without any processing.

On the other hand, when the instruction is a vector processing instruction, the unit 12 sends the instruction to the vector request bus 30, as well as issuing the instruction to its own vector processing instruction control unit 13 over the vector request bus 30.

The vector processing instruction control unit 13 receives the vector processing instruction sent from the memory access instruction control unit 12 which is issued by its own CPU and a vector processing instruction transferred from other CPU via the vector request bus 30 and issues an instruction to the vector processing units 14a–14n in its own CPU while managing their resource conditions.

The memory access network unit 15 receives the main storage access instruction "M-RQ" from the memory access instruction control unit 12 and issues an instruction to the main storage device 20, as well as receiving data read from the main storage device 20 and returning the data to the scalar processing unit 11 or the vector processing units 14a–14n according to kinds of instructions.

Figure 4:
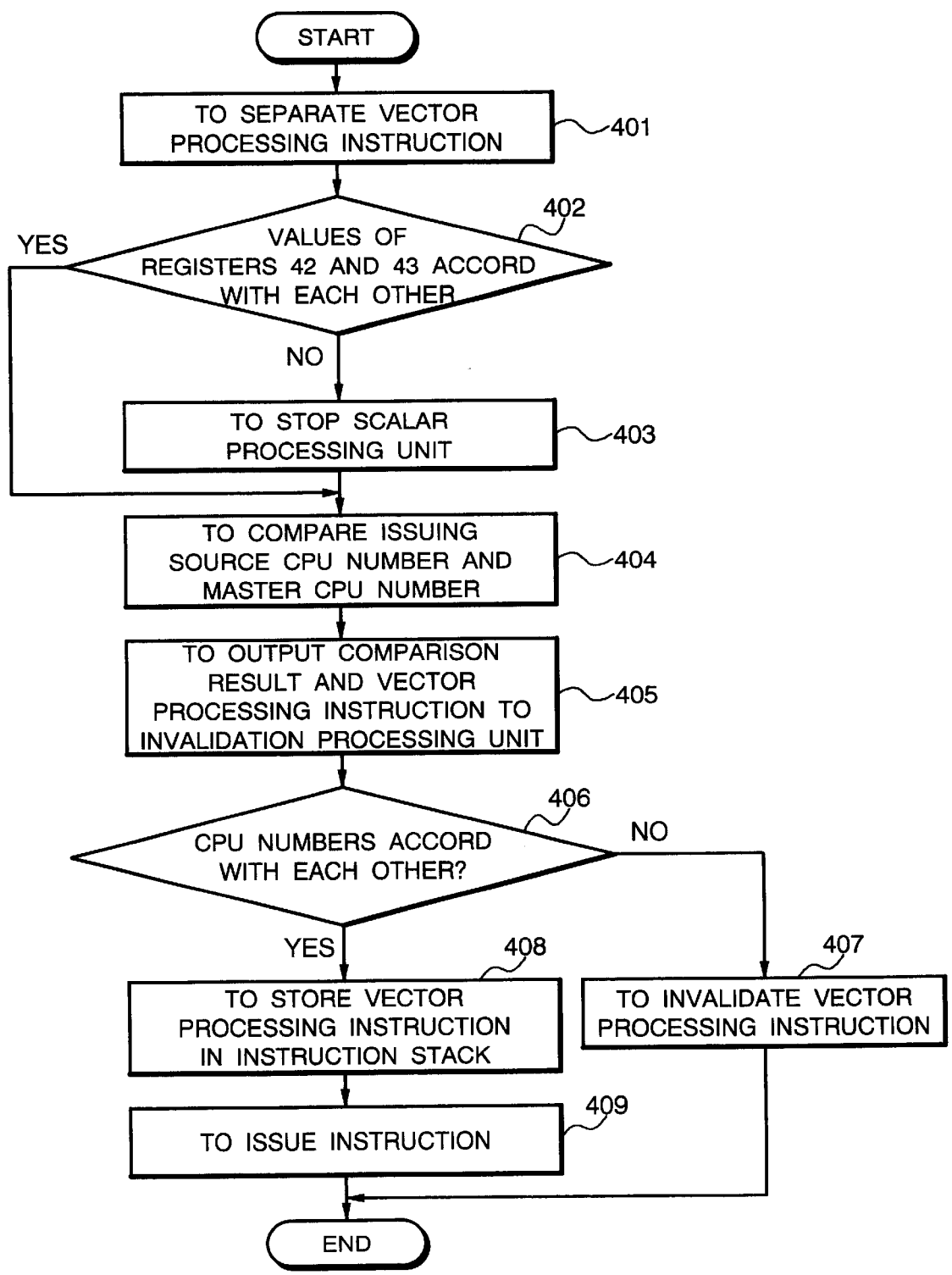
FIG. 4 is a flow chart for use in explaining operation of the vector processing instruction control unit of the above vector processing system according to the first embodiment.

Next, with reference to the structure of FIG. 3 and the flow chart of FIG. 4, operation of the vector processing instruction control unit 13 will be described.

The vector processing instruction sent to the vector processing instruction control unit 13 is separated into information regarding a CPU which has sent the instruction from the instruction issuing source information extraction unit 41 and a main body of the vector processing instruction (Step 401).

The vector processing instruction control unit 13 is provided with the register 42 which stores a CPU number externally set as a master for its own CPU and the register 43 which stores its own CPU number. It is assumed that at these two registers 42 and 43, the above numbers are respectively set as initial operation before starting the system.

In the present embodiment, the CPUs 10a–10n of each shared memory system are divisionally set as a master CPU and slave CPUs. The master CPU executes scalar processing, as well as issuing a vector processing instruction to other CPU. On the other hand, the slave CPU receives a vector processing instruction transferred from the master CPU to operate as a multi-vector pipeline in synchronization with the vector processing units 14a–14n in the master CPU. At this time, in the slave CPU, the scalar processing unit 11 enters an inactive state and only the vector processing units 14a–14n, the vector processing instruction control unit 13 and the memory access network unit will function effectively.

The contents of the register 42 which stores a master CPU number and the register 43 which stores its own CPU number are compared at the comparator 45 (Step 402) and when they disaccord with each other, determination is made that its own CPU is a slave CPU to control the scalar processing unit 11 of its own CPU to stop operation (Step 403).

On the other hand, the instruction issuing source CPU number taken out at the instruction issuing source information extraction unit 41 from the vector processing instruction transferred through the vector request bus 30 and the contents of the register 42 which stores a master CPU number are compared at another comparator 44 (Step 404). The comparison result obtained at this step and the vector processing instruction separated at the instruction issuing source information extraction unit 41 are applied to the invalidation processing unit 46 (Step 405).

When the comparison result obtained by the comparator 44 finds disaccord (Step 406), the applied vector processing instruction is not a vector processing instruction issued from the master CPU for its own CPU operating as a slave and is therefore invalidated at the invalidation processing unit 46 (Step 407). More specifically, according to comparison results obtained by the comparator 44, a flag indicative of effective or ineffective is attached to a vector processing instruction and the invalidation processing unit 46 stores only a vector processing instruction indicated as effective by the flag in the instruction stack 47. An ineffective vector processing instruction is not stored in the instruction stack 47.

As a matter of course, when its own CPU operates as a master CPU and a transferred vector processing instruction is an instruction issued by its own CPU, a result obtained by the comparator 44 shows accord to avoid invalidation.

Since the vector processing instructions not invalidated by the invalidation processing unit 46 are instructions to be processed at the vector processing units 14a–14n in its own CPU, they are stored in the instruction stack 47 in the order of acceptance (Step 408). Invalidated vector processing instructions are not stored in the instruction stack 47 but abandoned.

The resource management/instruction issuing processing unit 48 manages the resources 14a–14n of the vector processing units in its own CPU. The instructions stored in the instruction stack 47 are issued at the resource management/ instruction issuing processing unit 48 to the vector processing units 14a14n of its own CPU in the order of priority and the order of instructions which enter an issuable state according to resource conditions of the vector processing units 14a–14n (Step 409). Here, overtaking issuance of an instruction is also possible without conforming to the order of storage into the instruction stack 47.

At the time when vector processing at each slave CPU is completed, the master CPU is notified of the end of the processing. Upon confirming the reception of notifications of the end from all the slave CPUs, the master CPU will issue a subsequent vector processing instruction.

The foregoing arrangement enables a CPU set as a master CPU and a plurality of CPUs which store the number of this CPU as a master CPU number to be regarded as processors of a multi-vector pipeline operating in one body.

At this time, only the scalar processing unit 11 of the master CPU functions and scalar processing units 11 of the slave CPUs halt their functions by a control signal "HALT" from the vector processing instruction control units 13.

The vector processing instruction issued from the scalar processing unit 11 of the master CPU through the vector request bus 30 is determined to be effective at each vector processing instruction control unit 13 of the slave CPUs including its own CPU and will be processed in parallel operation at the vector processing units 14a–14n of the plurality of CPUs.

Although in a case where one vector processing unit exists in one CPU, for example, assuming that the number of CPUs sharing the main storage device 20 is 32, the system is usually fixed to have 32 CPUs each having "1 scalar processing unit+1 vector processing unit", setting one master CPU to correspond to one slave CPU allows the system to operate to have 16 CPUs each having "1 scalar processing unit+2 vector processing units".

According to the setting contents of the master CPU and the slave CPU, it is also possible to make the system include both a CPU having "1 scalar processing unit+1 vector processing unit" and a CPU having "1 scalar processing unit+4 vector processing units". In other words, various structures can be realized according to the setting contents of a master CPU and a slave CPU.

Next, a vector processing system according to the second embodiment will be described.

Figure 5:
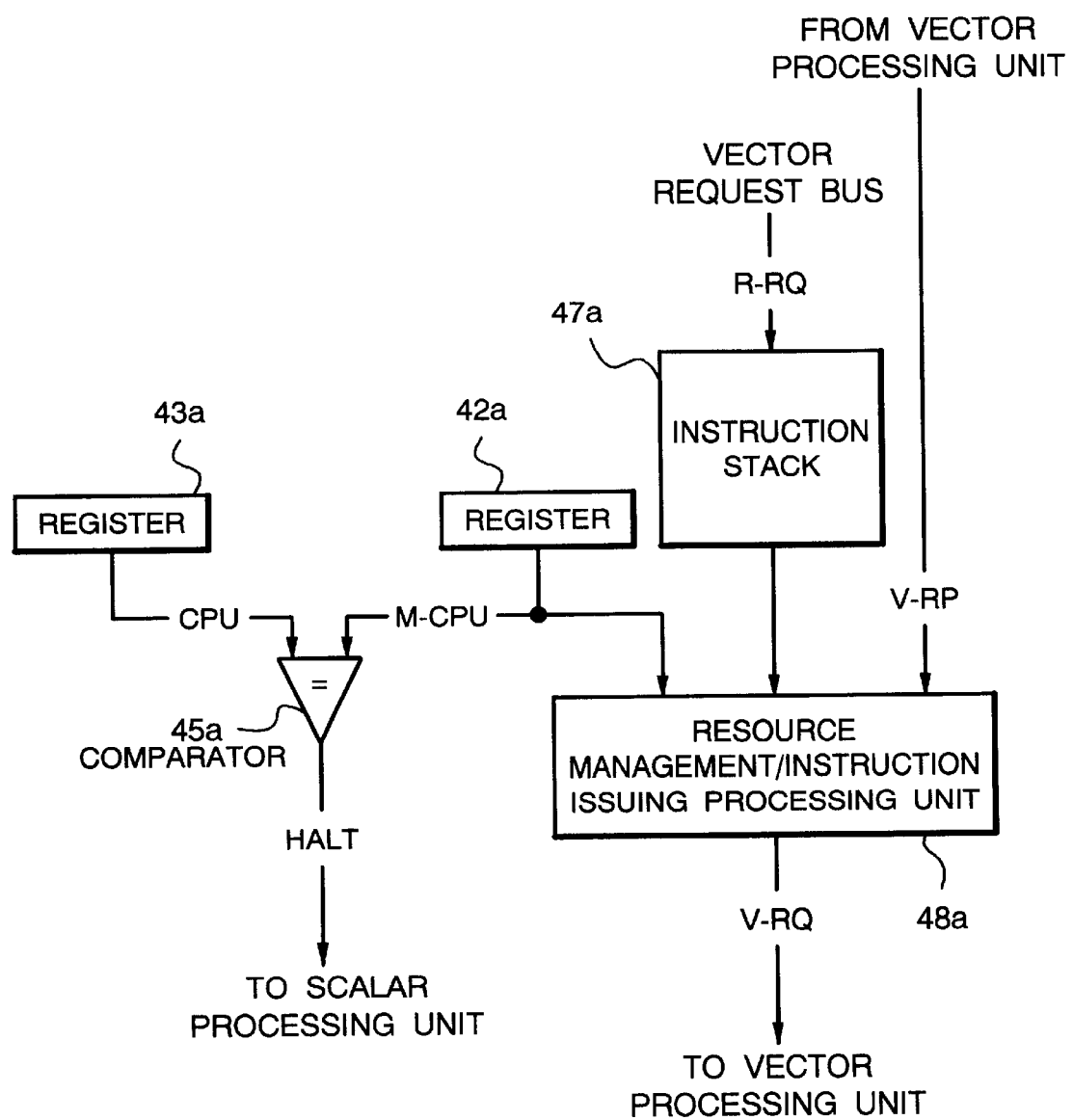
FIG. 5 is a block diagram showing structure of a vector processing instruction control unit of a vector processing system according to a second embodiment.

FIG. 5 is a block diagram showing structure of a vector processing instruction control unit 13 of the vector processing system according to the second embodiment. Structure of the remaining part except the vector processing instruction control unit 13 is the same as that of the above-described first embodiment.

The structure of the vector processing instruction control unit 13 shown in FIG. 5 is the same as that shown in FIG. 3 in that a register 42a which stores a master CPU number and a register 43a which store its own CPU number are provided and the function of the scalar processing unit 11 of its own CPU is halted based on an output of a comparator 45a which compares the contents of the two registers 42a and 43a. This vector processing instruction control unit 13 is also provided with a resource management/instruction issuing processing unit 48a having a function of comparing a master CPU number of the register 42a and issuing source CPU information contained in a vector processing instruction and a function of controlling instruction issuance based on a comparison result.

Figure 6:
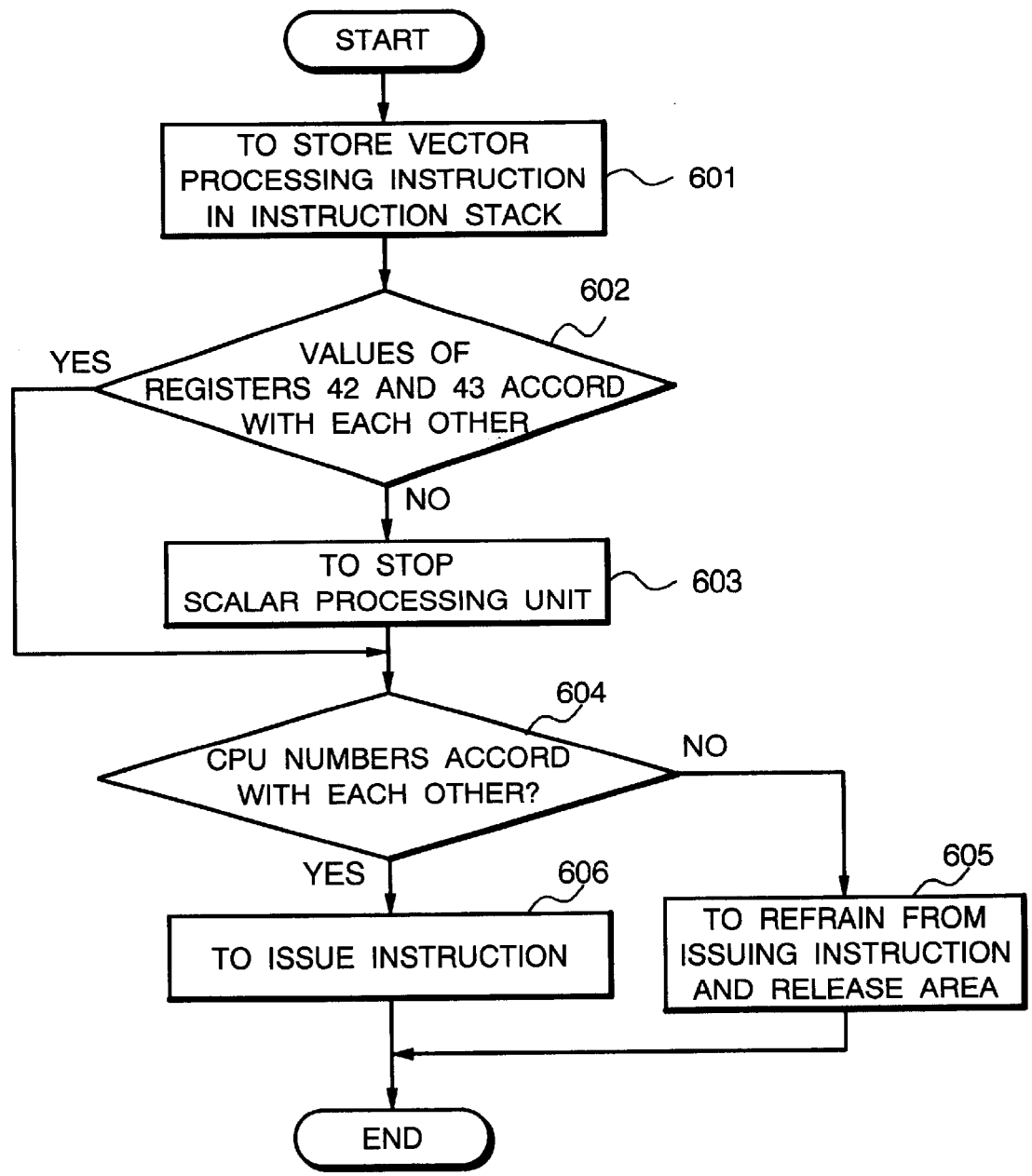
FIG. 6 is a flow chart for use in explaining operation of the vector processing instruction control unit of the above vector processing system according to the second embodiment.

Operation of the vector processing instruction control unit 13 will be described with reference to the flow chart of FIG. 6. In this example of structure, vector processing instructions transferred through the vector request bus 30 are sequentially stored in an instruction stack 47a without any processing as illustrated in FIG. 6 (Step 601). The instruction stack 47a is accordingly provided with records for storing issuing source CPU information as well as vector processing instructions.

The contents of the register 42a which stores a master CPU number and the register 43a which stores its own CPU number are compared at the comparator 45a (Step 602) and when they disaccord with each other, determination is made that its own CPU is a slave CPU to control the scalar processing unit 11 of its own CPU to stop operation (Step 603).

Next, the resource management/instruction issuing processing unit 48a, at the issuance of an instruction to the vector processing unit, compares issuing source CPU information accompanying the vector processing instruction and the contents of the register 42a which stores a master CPU number (Step 604). When the numbers disaccord with each other, the unit 48a refrains from issuing an inappropriate vector processing instruction, as well as releasing a relevant area in the instruction stack 47a (Step 605). In other words, the system is structured not to conduct invalidation processing before the storage into the instruction stack 47a but to conduct invalidation processing at the time when an instruction is actually issued.

When the numbers accord with each other, similarly to the resource management/instruction issuing processing unit 48 in the first embodiment, instructions stored in the instruction stack 47a are issued to the vector processing units 14a–14n of its own CPU in the order of priority and the order of instructions which enter an issuable state according to resource conditions of the vector processing units 14a–14n (Step 606).

While the above-described first embodiment is structured to avoid storage of an invalid vector processing instruction into the instruction stack 47 by the provision of the instruction issuing source information extraction unit 41 for extracting an instruction issuing source CPU number of a vector processing instruction, the comparator 44 for comparing an instruction issuing source CPU number and a master CPU number, and the invalidation processing unit 46 for invalidating a vector processing instruction according to a comparison result, the second embodiment is structured to store all vector processing instructions including transmitted issuing resource CPU information in the instruction stack 47a and at a stage of instruction issuing processing by the resource management/instruction issuing processing unit 48a, issue only an appropriate vector processing instruction and release an area of the instruction stack 47a with respect to an inappropriate vector processing instruction. Comparison between the first embodiment and the second embodiment, accordingly, finds that the second embodiment is allowed to have a smaller volume of hardware and the fist embodiment is allowed to have a smaller storage capacity of an instruction stack.

On the other hand, also possible as system structure giving greater importance to scalar performance is structure of a multi-vector pipeline shared by a plurality of independent scalar processing units. In other words, possible is the system in which all the vector pipelines existing in a plurality of processors are regarded as one multi-vector pipeline to operate as if a scalar processing unit of each independent processor shared the single vector pipeline.

Figure 7:
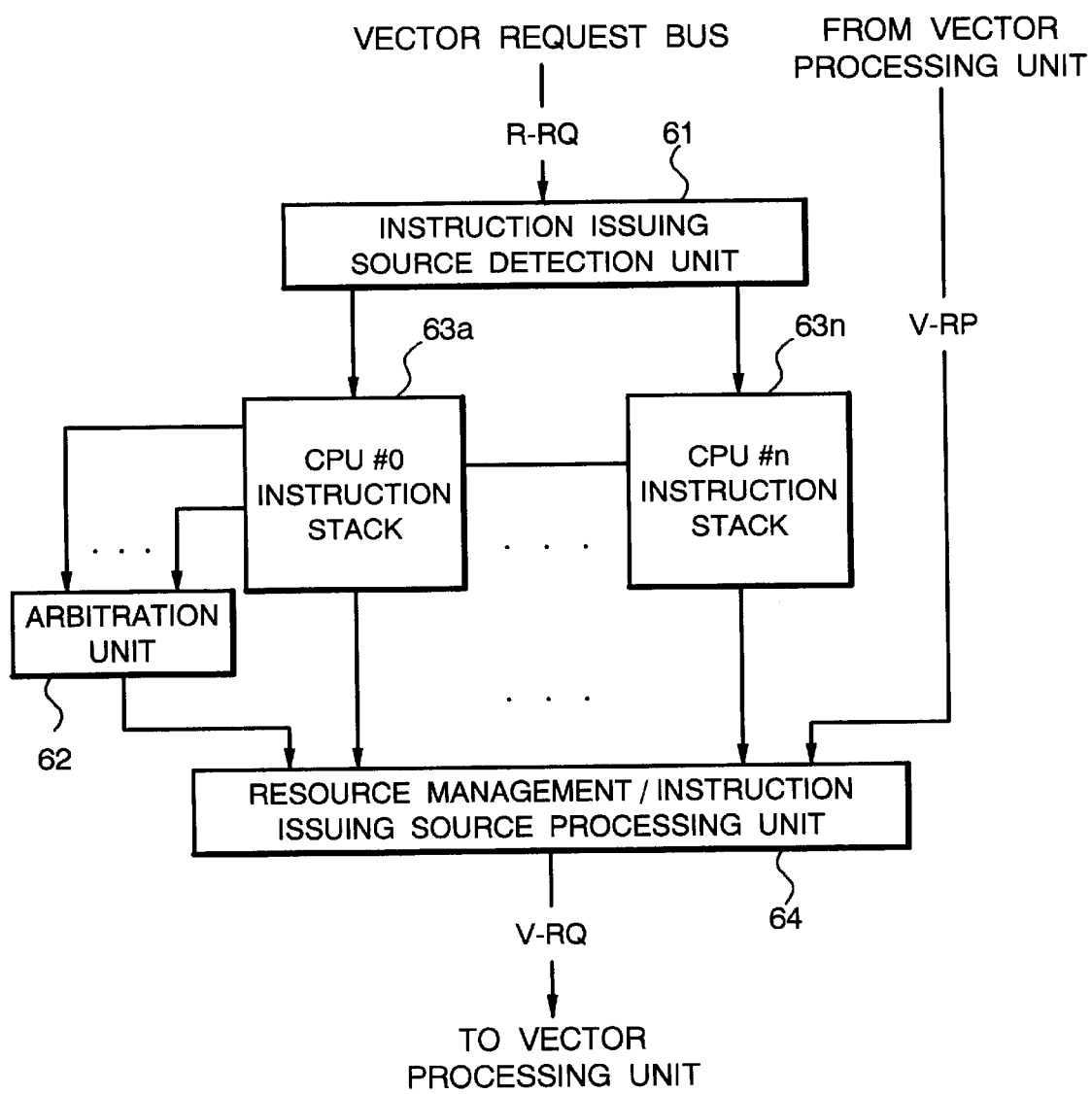
FIG. 7 is a block diagram showing structure of a vector processing instruction control unit of a vector processing system according to a third embodiment.

Structure of a vector processing instruction control unit 13 of a vector processing system according to a third embodiment which realizes the above system is shown in FIG. 7. Since structure of other part of the system than the vector processing instruction control unit 13 is the same as that of the above-described first embodiment, common reference numerals are allotted to omit their description.

In the vector processing system according to the third embodiment, a vector processing instruction control unit 13 includes an instruction issuing source detection unit 61, instruction stacks 63a–63n provided for the respective CPUs, an arbitration unit 62 for arbitrating the order of issuance based on priority set at the instruction stacks 63a–63n, and a resource management/instruction issuing processing unit 64.

Figure 8:
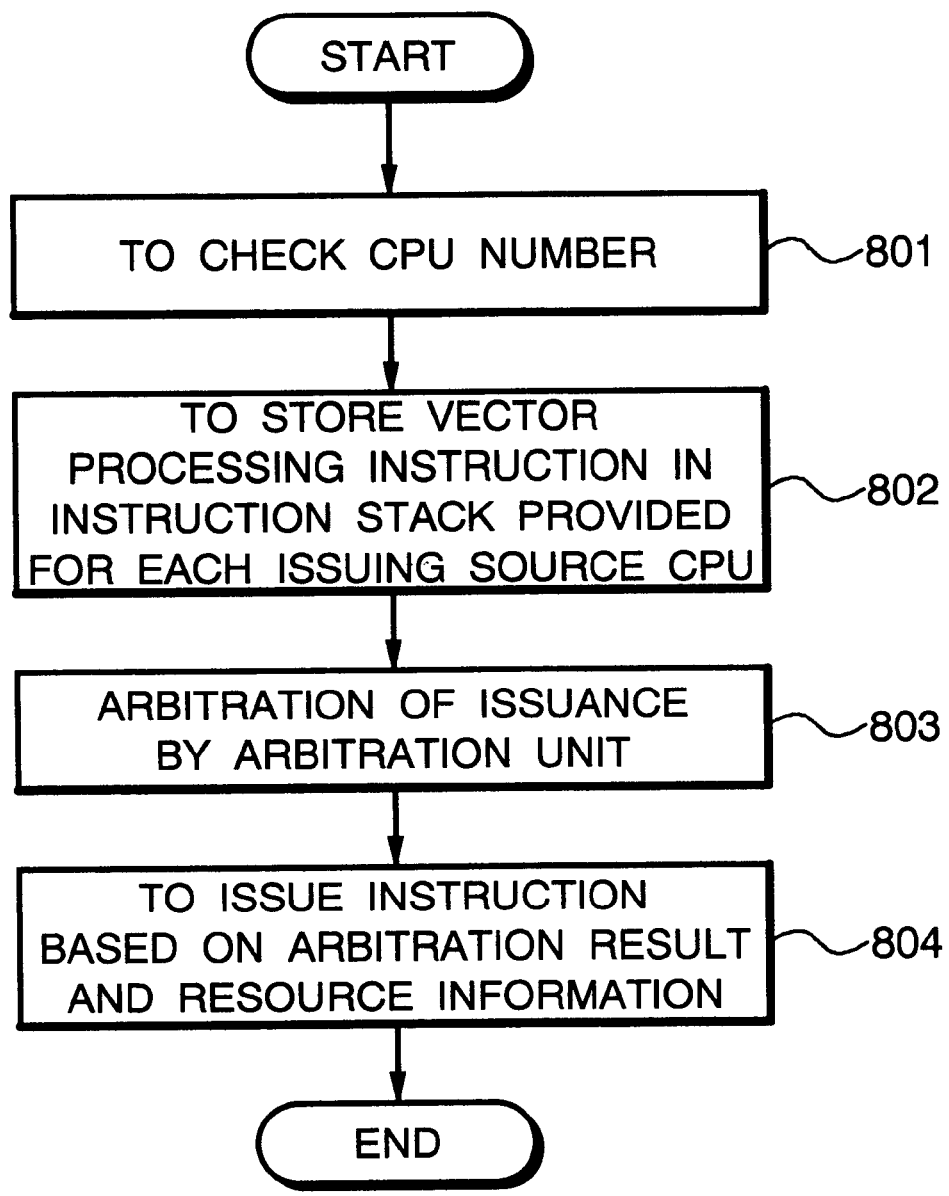
FIG. 8 is a flow chart for use in explaining operation of the vector processing instruction control unit of the above vector processing system according to the third embodiment.
Figure 9:
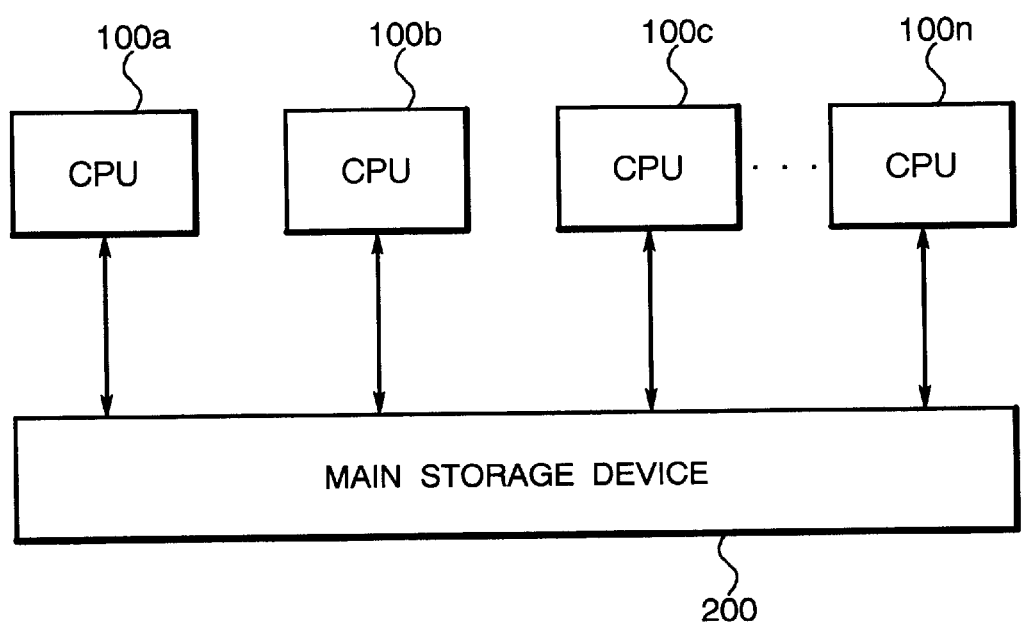
FIG. 9 is a block diagram showing structure of a shared memory type parallel processing system using CPUs at a conventional vector processing device.
Figure 10:
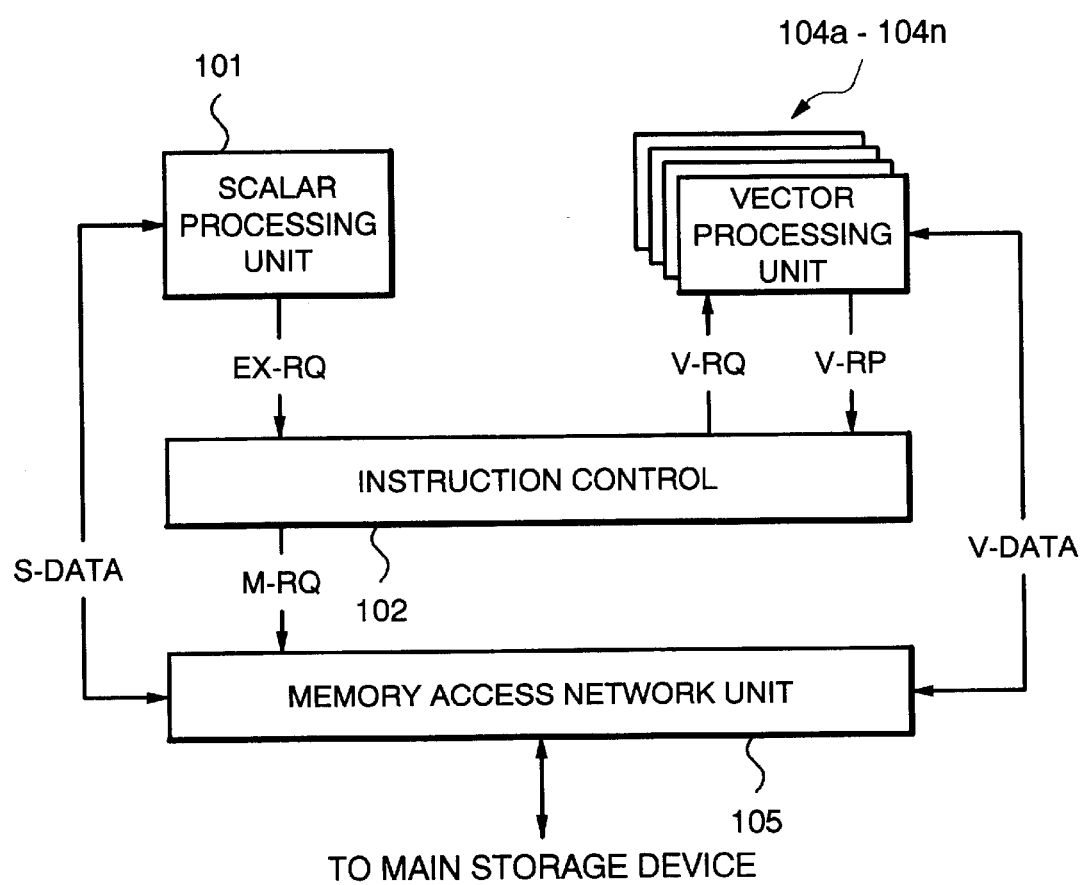
FIG. 10 is a block diagram showing structure of each CPU of the vector processing device shown in FIG. 9.

In the following, operation of the vector processing instruction control unit 13 according to the present embodiment will be described with reference to the flow chart of FIG. 8.

Vector processing instructions transferred through the vector request bus 30 are stored in the instruction stacks 63a–63n provided for the respective CPUs via the instruction issuing source detection unit 61. The stored vector processing instruction is applied to the resource management/instruction issuing processing unit 64 together with an arbitration result obtained by the arbitration unit 62 and resource information "V-RP" from each of the vector processing units 14a–14n and then issued to the respective vector processing units 14a–14n.

Here, the vector processing instructions transferred via the vector request bus 30 have their issuing source CPU numbers checked at the instruction issuing source detection unit 61 (Step 801). Thereafter, the vector processing instructions are stored divisionally at the instruction stacks 63a–63n provided for the respective issuing source CPUs (Step 802).

Then, determination from which of the instruction stacks 63a–63n an instruction is to be issued is made by the arbitration unit 62 which arbitrates contention according to priority (Step 803). The arbitration unit 62 determines from which of the instruction stacks 63a–63a an instruction is to be issued according to round-robin scheduling, for example. Using an output of the arbitration unit 62 and resource information of each vector processing unit, an instruction to be issued is determined at the resource management/instruction issuing processing unit 64 (Step 804).

At this time, while with vector processing instructions whose issuing source CPUs are the same, overtaking issuance to pass the order of storage into an instruction stack is impossible, with vector processing instructions whose issuing source CPUs are different, overtaking issuance, which is conducted depending on conditions of resources, cause no data contention and accordingly offers no problem. It is therefore unnecessary to in particular store the order of storage among instruction stacks. Also with respect to vector processing instructions whose CPU issuing sources are the same, provision of a suited resource management means for avoiding an access to the same address by comparing access addresses will enable overtaking issuance.

With the foregoing arrangement, all the vector processing instructions issued from the respective CPUs will be transferred to vector processing instruction control units of all the CPUs and subjected to issuing processing. Since at this time, the vector processing instructions are managed under a classification of their issuing source CPUs, the vector processing unit existing in each CPU will operate as a single vector processing unit unified by all the CPUs as if it was shared by scalar processing units of all the CPUs.

The above-described vector processing system can be realized not only as hardware but also as software by means of a control program for realizing the above-described functions which is recorded in a magnetic disc, a semiconductor memory and other recording medium 18 as illustrated in FIG. 2. The control program is read from the recording medium 18 into a CPU to control operation of the CPU, thereby realizing the above-described vector processing instruction controlling function. In other words, the processing illustrated in FIGS. 4, 6 and 8 is executed.

The present invention is not limited to the above-described embodiments and can be embodied in variable forms within the scope of the technical ideas. For example, in the diagram of the entire system structure in FIG. 1, the vector request bus 30 for transferring vector processing instructions among the respective CPUs 10a–10n is illustrated as a single bus. It is, however, apparent that the transfer means is not limited to a single bus but is realized by any connection means such as a multi-bus and a cross-bar switch.

As described in the foregoing, the vector processing system of the present invention and the controlling method thereof can attain the following effects.

First, since the system is structured to flexibly change the number of vector pipelines accompanying a scalar processing unit according to purposes by changing a manner of allotting processors as a master processor and a slave processor, the vector processing system is allowed to have optimum multi-vector pipeline structure for various applications different in vectorization rate and vector length.

This is because with a bus provided for transferring vector processing instructions issued from each CPU to all CPUs, a vector processing instruction control means of each CPU reads a transferred vector processing instruction and its issuing source CPU information, and only when a master CPU number stored by its own CPU at a slave state and an issuing source CPU number accord with each other, processes the transferred vector processing instruction.

As a result, by changing a combination of master CPUs and slave CPUs among the respective CPUs in the parallel processing system, the system can be flexibly changed, for example, from the structure giving the greatest importance to scalar throughput performance in which the respective CPUs are all regarded as master CPUs and a vector processing instruction of its own CPU is processed only by its own CPU to the structure suited for large-scale processing with extremely large vector length in which with one master CPU, all the remaining CPUs operate as slave CPUs.

Secondly, as a mode of a system as an extension of said first effect, a shared memory type parallel processing system can be provided which has a single vector processing means shared by a plurality of scalar processing means intended for an application giving more importance to the scalar processing performance.

This is because with a vector processing instruction stack for each CPU provided at a vector processing instruction control of each CPU, storing vector processing instructions transferred between the CPUs in the instruction stack under a classification of their issuing source CPUs and sequentially issuing the vector processing instructions to the vector processing units while arbitrating contention of instructions within each instruction stack enables the vector processing means existing in all the CPUs to operate as a single vector processing means as if it was shared by all the CPUs.

As a result, it is possible to provide, for the field of applications giving importance to scalar throughput performance and having the extremely low frequency of occurrences of vector processing instructions, a system enabling more efficient processing by making the most of vector processing resources.

Thirdly, development of an LSI in which scalar processing means and vector processing means are integrated into one chip is possible to reduce the number of development steps and costs.

The reason is that since structure of a multi-vector pipeline for the scalar processing means can be flexibly modified by external setting, integrating the scalar processing means and the vector processing means into the same LSI, which has been difficult so far, becomes possible to enable reduction of the number of kinds of LSI developments as a result.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU, said master CPU comprises:

issuing means for issuing said vector processing instruction with issuing source CPU information attached for identifying an issuing source CPU, and transferring the instruction to all of said CPUs through said path, and each of said master CPU and said slave CPU comprises:

vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise:

comparison means for comparing said issuing source CPU information contained in said transferred vector processing instruction and said master CPU information, an instruction stack for storing vector processing instructions, invalidation processing means for storing said vector processing instruction in the instruction stack when a comparison by said comparison means results in finding accord, and invalidating said vector processing instruction when the comparison results in finding disaccord, and instruction issuing processing means for issuing an instruction based on said vector processing instruction stored in said instruction stack to said vector processing means according to resource conditions of said vector processing means.

2. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU, said master CPU comprises:

issuing means for issuing said vector processing instruction with issuing source CPU information attached for identifying an issuing source CPU, and transferring the instruction to all of said CPUs through said path, and each of said master CPU and said slave CPU comprises:

vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise:

extraction means for separating said transferred vector processing instruction into a main body of said vector processing instruction and said issuing source CPU information and outputting the instruction and information, comparison means for comparing said separated issuing source CPU information and the master CPU information, invalidation processing means for storing said vector processing instruction from said extraction means into an instruction stack when a comparison by said comparison means results in finding accord, and invalidating said vector processing instruction when the comparison results in finding disaccord, and instruction issuing processing means for issuing an instruction based on said vector processing instruction stored in said instruction stack to said vector processing means according to resource conditions of said vector processing means.

3. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU, said master CPU comprises:

issuing means for issuing said vector processing instruction with issuing source CPU information attached for identifying an issuing source CPU, and transferring the instruction to all of said CPUs through said path, and each of said master CPU and said slave CPU comprises:

vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise:

an instruction stack for storing said transferred vector processing instruction, and instruction issuing processing means for comparing said issuing source CPU information contained in said vector processing instruction stored in said instruction stack and said master CPU information and when a comparison results in finding accord, issuing an instruction based on said vector processing instruction to said vector processing means and when the comparison results in finding disaccord, refraining from issuing an instruction based on said vector processing instruction to release the relevant area of said instruction stack.

4. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU, said master CPU comprises:

issuing means for issuing said vector processing instruction with issuing source CPU information attached for identifying an issuing source CPU, and transferring the instruction to all of said CPUs through said path, and each of said master CPU and said slave CPU comprises:

vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise:

an instruction stack for storing said transferred vector processing instruction, and instruction issuing processing means for comparing said issuing source CPU information contained in said vector processing instruction stored in said instruction stack and said master CPU information, and when a comparison results in finding accord, issuing an instruction based on said vector processing instruction to said vector processing means and when the comparison results in finding disaccord, refraining from issuing an instruction based on said vector processing instruction to release the relevant area of said instruction stack, and wherein in said instruction stack, said vector processing instruction is stored with said issuing source CPU information.

5. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, and each of said CPUs comprises:

issuing means for issuing said vector processing instruction with issuing source CPU information attached for identifying an issuing source CPU, and transferring the instruction to all of said CPUs through said path, and vector processing instruction control means for comparing said issuing source CPU information contained in said transferred vector processing instruction and structure information regarding a vector pipeline of its own CPU to determine contents of processing for said transferred vector processing instruction, wherein said vector processing instruction control means of each of said CPUs comprise stopping means for stopping operation of said scalar processing means of a CPU comprising said vector processing instruction control means when said CPU comprising said vector processing instruction control means is a slave CPU.

6. A shared memory type vector processing system including a plurality of CPUs sharing a main storage memory and each having scalar processing means and vector processing means, wherein said CPUs are connected to each other by a path for transferring a vector processing instruction generated from any of said CPUs to each of said CPUs, said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU, said master CPU comprises:

issuing means for issuing said vector processing instruction with issuing source CPU information attached for identifying an issuing source CPU, and transferring the instruction to all of said CPUs through said path, and each of said master CPU and said slave CPU comprises:

vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise stopping means for stopping operation of said scalar processing means of a CPU comprising said vector processing instruction control means when said CPU comprising said vector processing instruction control means is a slave CPU.

7. A shared memory type vector processing system including a plurality of CPUs sharing a main storage memory and each having scalar processing means and vector processing means, wherein
said CPUs are connected to each other by a path for transferring a vector processing instruction generated from any of said CPUs to each of said CPUs, and
each of said CPUs comprises:
issuing means for issuing said vector processing instruction with issuing source CPU information attached for identifying an issuing source CPU, and transferring the instruction to all of said CPUs through said path, and
vector processing instruction control means for comparing said issuing source CPU information contained in said transferred vector processing instruction and structure information regarding a vector pipeline of its own CPU to determine contents of processing for said transferred vector processing instruction, wherein
said vector processing instruction control means of each of said CPUs comprises stopping means for stopping operation of said scalar processing means of a CPU comprising said vector processing instructions control means when said CPU comprising said vector processing instruction control means is a slave CPU, said stopping means comprising:
storage means for storing master CPU information indicative of a CPU functioning as a master CPU and CPU information of a CPU comprising said vector processing instruction control means, and
comparison means for comparing said master CPU information and said CPU information stored in said storage means when said vector processing instruction is transferred and outputting an operation stop signal of said scalar processing means of said CPU comprising said vector processing instruction control means when the comparison results in finding disaccord.

8. A shared memory type vector processing system including a plurality of CPUs sharing a main storage memory and each having scalar processing means and vector processing means, wherein
said CPUs are connected to each other by a path for transferring a vector processing instruction generated from any of said CPUs to each of said CPUs,
said CPUs are divisionally set to be a master CPU for executing scalar processing, as well as issuing a vector processing instruction to other CPUs and a slave CPU for receiving a vector processing instruction transferred from said master CPU to operate as a multi-vector pipeline in synchronization with the vector processing means in the master CPU,
said master CPU comprises:
issuing means for issuing said vector processing instruction with issuing source CPU information attached for identifying an issuing source CPU, and transferring the instruction to all of said CPUs through said path, and
each of said master CPU and said slave CPU comprises:
vector processing instruction control means for comparing said issuing source CPU information contained in said transferred vector processing instruction and master CPU information set at a CPU comprising said vector processing instruction control means, to issue, to said vector processing means, an instruction based on said transferred vector processing instruction when the information accord with each other and invalidate said vector processing instruction when the information disaccord with each other, wherein said vector processing instruction control means of each of said master CPU and said slave CPU comprise stopping means for stopping operation of said scalar processing means of a CPU comprising said vector processing instruction control means when said CPU comprising said vector processing instruction control means is a slave CPU, said stopping means comprising:
storage means for storing master CPU information indicative of a CPU functioning as a master CPU and CPU information of said CPU comprising said vector processing instruction control means, and
comparison means for comparing said master CPU information and said CPU information stored in said storage means when said vector processing instruction is transferred and outputting an operation stop signal of said scalar processing means of said CPU comprising said vector processing instruction control means when the comparison results in finding disaccord.

9. A shared memory type vector processing system including a plurality of CPUs sharing a main storage memory and each having scalar processing means and vector processing means, wherein
said CPUs are connected to each other by a path for transferring a vector processing instruction generated from any of said CPUs to each of said CPUs, and
each of said CPUs comprises:
issuing means for issuing a vector processing instruction with issuing source CPU information attached for identifying an issuing source CPU, and transferring the instruction to all of said CPUs through said path, and
vector processing instruction control means for storing said transferred vector processing instruction in at least one of a plurality of instruction stacks corresponding to the respective CPUs based on said issuing source CPU information to control instruction issuance based on said vector processing instruction according to priority of each of said plurality of instruction stacks and resource information of said vector processing means.

10. The shared memory type vector processing system as set forth in claim 9, wherein
said vector processing instruction control means of each of said CPUs comprises:
said plurality of instruction stacks corresponding to the respective CPUs,
instruction issuing source detection means for detecting said issuing source CPU information contained in said transferred vector processing instruction and storing said vector processing instruction in said al least one instruction stack corresponding to the information,
arbitration means for determining, for each of said plurality of instruction stacks, instruction issuance based on a vector processing instruction from which instruction stack the priority is to be given to, and
instruction issuing processing means for issuing an instruction based on said vector processing instruction to said vector processing means according to the contents determined by said arbitration means and resource information of said vector processing means.

11. A method of controlling a shared memory type vector processing system including a plurality of CPUs sharing a main storage memory and each having scalar processing means and vector processing means, comprising the steps of:
divisionally setting said CPUs to be a master CPU for executing scalar processing, as well as issuing a vector processing instruction to other CPUs and a slave CPU for receiving a vector processing instruction transferred from said master CPU to operate as a multi-vector pipeline in synchronization with a vector processing means in the master CPU, at said master CPU, issuing said vector processing instruction with issuing source CPU information attached for identifying an issuing source CPU, and transferring the instruction to all the CPUs through a path connecting the CPUs to each other, and at said each of said master CPU and said slave CPU comparing said issuing source CPU information contained in said transferred vector processing instruction and master CPU information set at a CPU receiving said transferred vector processing instruction, issuing, to said vector processing means, an instruction based on said transferred vector processing instruction when a comparison results in finding accord and invalidating said vector processing instruction when the comparison results in finding disaccord, comparing said issuing source CPU information contained in said transferred vector processing instruction and master CPU information set at said CPU receiving said transferred vector processing instruction, storing said vector processing instruction in an instruction stack when a comparison results in finding accord and invalidating said vector processing instruction when the comparison results in finding disaccord, and issuing an instruction based on said vector processing instruction stored in said instruction stack to said vector processing means according to resource conditions of said vector processing means.

12. A method of controlling a shared memory type vector processing system including a plurality of CPUs sharing a main storage memory and each having scalar processing means and vector processing means, comprising the steps of:

divisionally setting said CPUs to be a master CPU for executing scalar processing, as well as issuing a vector processing instruction to other CPUs and a slave CPU for receiving a vector processing instruction transferred from said master CPU to operate as a multi-vector pipeline in synchronization with at vector processing means in the master CPU, at said master CPU, issuing said vector processing instruction with issuing source CPU information attached for identifying an issuing source CPU, and transferring the instruction to all the CPUs through a path connecting the CPUs to each other, and at said each of said master CPU and said slave CPU comparing said issuing source CPU information contained in said transferred vector processing instruction and master CPU information set at a CPU receiving said transferred vector processing instruction, and issuing, to said vector processing means, an instruction based on said transferred vector processing instruction when a comparison results in finding accord and invalidating said vector processing instruction when the comparison results in finding disaccord, comparing said issuing source CPU information contained in said transferred vector processing instruction and master CPU information set at said CPU receiving said transferred vector processing instruction, storing said vector processing instruction in an instruction stack when a comparison results in finding accord and invalidating said vector processing instruction when the comparison results in finding disaccord, and issuing an instruction based on said vector processing instruction stored in said instruction stack to said vector processing means according to resource conditions of said vector processing means, or at said each of said master CPU and said slave CPU comparing said issuing source CPU information contained in said vector processing instruction stored in the instruction stack and master CPU information set at said CPU receiving said transferred vector processing instruction, and issuing an instruction based on said vector processing instruction to said vector processing means when a comparison results in finding accord and refraining from issuing an instruction based on said vector processing instruction to release a relevant area of said instruction stack when a comparison results in finding disaccord.

13. A shared memory type vector processing system including a plurality of CPUs sharing a main storage memory and each having scalar processing means and vector processing means, comprising the steps of:

at each of said CPUs issuing a vector processing instruction with issuing source CPU information attached for identifying an issuing source CPU, and transferring the instruction to all the CPUs through a path connecting the CPUs to each other, comparing said issuing source CPU information contained in said transferred vector processing instruction and structure information regarding a vector pipeline of a CPU receiving said transferred vector processing instruction to determine contents of processing for said transferred vector processing instruction, and stopping operation of said scalar processing means of said CPU receiving said transferred vector processing instruction when said CPU receiving said transferred vector processing instruction is a slave CPU.

14. A method of controlling a shared memory type vector processing system including a plurality of CPUs sharing a main storage memory and each having scalar processing means and vector processing means, comprising the steps of:

divisionally setting said CPUs to be a master CPU for executing scalar processing, as well as issuing a vector processing instruction to other CPUs and a slave CPU for receiving a vector processing instruction transferred from said master CPU to operate as a multi-vector pipeline in synchronization with a vector processing means in the master CPU, at said master CPU, issuing said vector processing instruction with issuing source CPU information attached for identifying an issuing source CPU, and transferring the instruction to all the CPUs through a path connecting the CPUs to each other, and at each of said master CPU and said slave CPU comparing said issuing source CPU information contained in said transferred vector processing instruction and master CPU information set at a CPU receiving said transferred vector processing instruction, issuing, to said vector processing means, an instruction based on said transferred vector processing instruction when a comparison results in finding accord and invalidating said vector processing instruction when the comparison results in finding disaccord, and stopping operation of said scalar processing means of said CPU receiving said transferred vector processing instruction when said CPU receiving said transferred vector processing instruction is a slave CPU.

15. A method of controlling a shared memory type vector processing system including a plurality of CPUs sharing a main storage memory and each having scalar processing means and vector processing means, comprising the steps of:

connecting said CPUs to each other by a path for transferring a vector processing instruction generated from any of said CPUs to each of said CPUs, and at each of said CPUs issuing a vector processing instruction with issuing source CPU information attached for identifying an issuing source CPU, and transferring the instruction to all the CPUs through said path, and storing said transferred vector processing instruction in a plurality of instruction stacks corresponding to the respective CPUs based on said issuing source CPU information to control instruction issuance based on said vector processing instruction according to priority of each of said plurality of instruction stacks and resource information of said vector processing means.

16. The method of controlling a shared memory type vector processing system as set forth in claim 15, further comprising the steps of:

at each of said CPUs detecting said issuing source CPU information contained in said transferred vector processing instruction and storing said vector processing instruction in the instruction stack corresponding to the information, determining, for each of said plurality of instruction stacks, instruction issuance based on a vector processing instruction from which instruction stack the priority is to be given to, and issuing an instruction based on said vector processing instruction to said vector processing means according to said determination contents and resource information of said vector processing means.

17. A computer readable memory which stores a control program for controlling a shared memory type vector processing system including a plurality of CPUs sharing a main storage memory and each having scalar processing means and vector processing means, said control program comprising the steps of:

divisionally setting said CPUs to be a master CPU for executing scalar processing, as well as issuing a vector processing instruction to other CPUs and a slave CPU for receiving a vector processing instruction transferred from said master CPU to operate as a multi-vector pipeline in synchronization with a vector processing means in the master CPU, at said master CPU, issuing said vector processing instruction with issuing source CPU information attached for identifying an issuing source CPU, and transferring the instruction to all the CPUs through said path, and at each of said master CPU and said slave CPU comparing said issuing source CPU information contained in said transferred vector processing instruction and master CPU information set at a CPU receiving said vector processing instruction, and issuing, to said vector processing means, an instruction based on said transferred vector processing instruction when a comparison results in finding accord and invalidating said vector processing instruction when the comparison results in finding disaccord, said control program further comprising the steps of:

at each of said master CPU and said slave CPU comparing said issuing source CPU information contained in said transferred vector processing instruction and master CPU information set at a CPU receiving said vector processing instruction, storing said vector processing instruction in an instruction stack when a comparison results in finding accord and invalidating said vector processing instruction when the comparison results in finding disaccord, and issuing an instruction based on said vector processing instruction stored in said instruction stack to said vector processing means according to resource conditions of said vector processing means.

18. A computer readable memory which stores a control program for controlling a shared memory type vector processing system including a plurality of CPUs sharing a main storage memory and each having scalar processing means and vector processing means, said control program comprising the steps of:

divisionally setting said CPUs to be a master CPU for executing scalar processing, as well as issuing a vector processing instruction to other CPUs and a slave CPU for receiving a vector processing instruction transferred from said master CPU to operate as a multi-vector pipeline in synchronization with it vector processing means in the master CPU, at said master CPU, issuing said vector processing instruction with issuing source CPU information attached for identifying an issuing source CPU, and transferring the instruction to all the CPUs through said path, and at each of said master CPU and said slave CPU comparing said issuing source CPU information contained in said transferred vector processing instruction and master CPU information set at a CPU receiving said vector processing instruction, and issuing, to said vector processing means, an instruction based on said transferred vector processing instruction when a comparison results in finding accord and invalidating said vector processing instruction when the comparison results in finding disaccord, said control program further comprising the steps of:

at each of said master CPU and said slave CPU comparing said issuing source CPU information contained in said vector processing instruction stored in an instruction stack and master CPU information set at a CPU receiving said vector processing instruction, and issuing an instruction based on said vector processing instruction to said vector processing means when a comparison results in finding accord and refraining from issuing an instruction based on said vector processing instruction to release a relevant area of said instruction stack when a comparison results in finding disaccord.

19. A computer readable memory which stores it control program for controlling a shared memory type vector processing system including a plurality of CPUs sharing a main storage memory and each having scalar processing means and vector processing means, said control program comprising the steps of:

issuing a vector processing instruction with issuing source CPU information attached for identifying an issuing source CPU, and transferring the instruction to all the CPUs through a path connecting the CPUs to each other, and comparing said issuing source CPU information contained in said transferred vector processing instruction and structure information regarding a vector pipeline of a CPU receiving said vector processing instruction to determine contents for processing for said transferred vector processing instruction, wherein said control program at each of s aid CPUs stops operation of said scalar processing means of a CPU receiving said vector processing instruction a CPU receiving said vector processing instruction is a slave CPU.

20. A computer readable memory which stores a control program for control ling a shared memory type vector processing system including a plurality of CPUs sharing a main storage memory and each having scalar processing means and vector processing means, said control program comprising the steps of:

divisionally setting said CPUs to be a master CPU for executing scalar processing, as well is issuing a vector Processing instruction to other CPUs and a slave CPU for receiving a vector processing instruction transferred from said master CPU to operate as a multi-vector pipeline in synchronization with a vector processing means in the master CPU, at said master CPU, issuing said vector processing instruction with issuing source CPU information attached for identifying an issuing source CPU, and transferring the instruction to all the CPUs through said path, and at each of said master CPU and said slave CPU comparing said issuing source CPU information contained in said transferred vector processing instruction and master CPU information set at a CPU receiving said vector processing instruction, and issuing, to said vector processing means, an instruction based on said transferred vector processing instruction when a comparison results in finding accord and invalidating said vector processing instruction when the comparison results in finding disaccord, wherein said control program at each of said master CPU and said slave CPU stops operation of said scalar processing means of a CPU receiving said vector processing instruction when a CPU receiving said vector processing instruction is a slave CPU.

21. A computer readable memory which stores a control program for controlling a shared memory type vector processing system including a plurality of CPUs sharing a main storage memory and each having scalar processing means and vector processing means, said control program comprising the steps of:

issuing a vector processing instruction with issuing source CPU information attached for identifying an issuing source CPU, and transferring the instruction to all the CPUs through a path connecting the CPUs to each other, and storing said transferred vector processing instruction in a plurality of instruction stacks corresponding to the respective CPUs based on said issuing source CPU information to control instruction issuance based on said vector processing instruction according to priority of each of said plurality of instruction stacks and resource information of said vector processing means.

22. The computer readable memory which stores a control program for controlling a shared memory type vector processing system as set forth in claim 21, said control program further comprising the steps of:

detecting said issuing source CPU information contained in said transferred vector processing instruction and storing said vector processing instruction in the instruction stack corresponding to the information, determining, for each of said plurality of instruction stacks, instruction issuance based on a vector processing instruction from which instruction stack the priority is to be given to, and issuing an instruction based on said vector processing instruction to said vector processing means according to said determination contents and resource information of said vector processing means.

* * * * *